United States Patent [19]

Fehlauer et al.

[11] Patent Number: 5,315,226
[45] Date of Patent: May 24, 1994

[54] METHOD FOR CONTROLLING A SYNCHRONOUS MOTOR FOR IMPLEMENTATION OF AN EXACT START/STOP POSITIONING OPERATION IN A RECORDING APPARATUS

[75] Inventors: Ewald Fehlauer, Weiterstadt; Klaus Hofmann, Langen, both of Fed. Rep. of Germany

[73] Assignee: Linotype-Hell AG, Fed. Rep. of Germany

[21] Appl. No.: 3,590

[22] Filed: Jan. 13, 1993

[30] Foreign Application Priority Data

Jan. 13, 1992 [DE] Fed. Rep. of Germany ....... 4200607

[51] Int. Cl.⁵ ............................................. H02P 7/00
[52] U.S. Cl. .................................... 318/715; 318/703
[58] Field of Search ........ 318/700, 703, 712, 714–721, 318/685, 696

[56] References Cited

U.S. PATENT DOCUMENTS

| | | | |
|---|---|---|---|
| 4,103,216 | 7/1978 | Hayes | 318/685 |
| 4,115,726 | 9/1978 | Patterson et al. | 318/703 X |
| 4,126,821 | 11/1978 | Cannon | 318/696 |
| 4,219,767 | 8/1980 | Wimmer | 318/696 |
| 4,427,933 | 1/1984 | Wagener et al. | 318/711 |
| 4,446,412 | 5/1984 | Fiedman et al. | 318/696 |
| 4,704,698 | 11/1987 | Reiniger | 364/523 |
| 4,737,700 | 4/1988 | Doelves | 318/696 |
| 4,890,048 | 12/1989 | Hunter | 318/696 |
| 4,996,543 | 2/1991 | Moulin et al. | 354/5 |
| 5,038,090 | 8/1991 | Kawabata et al. | 318/721 |
| 5,100,120 | 3/1992 | Kikuchi et al. | 318/696 |

FOREIGN PATENT DOCUMENTS

| | | |
|---|---|---|
| WO85/04061 | 9/1985 | European Pat. Off. . |
| 0163850A1 | 12/1985 | European Pat. Off. . |
| 2834740 | 2/1980 | Fed. Rep. of Germany . |
| 3419288A1 | 11/1985 | Fed. Rep. of Germany . |
| 253530A1 | 1/1988 | Fed. Rep. of Germany . |
| 3915576A1 | 11/1989 | Fed. Rep. of Germany . |
| 4013583A1 | 11/1991 | Fed. Rep. of Germany . |

OTHER PUBLICATIONS

Industrie–elektrik +electronik, Jan., 1981, B. Borgonovi et al., "Neue Ansteue fur Schrittmotoren: 10 000 Schrit pro Umdrehung", pp. 24–28.

Primary Examiner—Jonathan Wysocki
Attorney, Agent, or Firm—Hill, Steadman & Simpson

[57] ABSTRACT

A method and apparatus for controlling a synchronous motor with an AC voltage. A rated value proportional to a desired frequency of the AC voltage and related to a rotational speed of the synchronous motor is provided. The rated value is continuously added up in an accumulator to provide added-up signal values. The added-up signal values are employed for addressing stored function values in a function value memory, the function values representing at least one AC voltage. The addressed function values are read out from the function value memory and are converted into at least one AC voltage having the frequency corresponding to the rated value. The AC voltage is supplied to the synchronous motor for generating a rotary field such that the frequency of the AC voltage defines the rotational speed of the synchronous motor.

19 Claims, 4 Drawing Sheets

METHOD FOR CONTROLLING A SYNCHRONOUS MOTOR FOR IMPLEMENTATION OF AN EXACT START/STOP POSITIONING OPERATION IN A RECORDING APPARATUS

BACKGROUND OF THE INVENTION

The invention is directed to a method and to a circuit arrangement for controlling an electric motor, whereby a rated value for the speed of the electric motor is prescribed and is converted into an AC voltage having a frequency proportional to the rated value for supplying the electric motor.

Innumerable embodiments of such circuit arrangements are employed in the field of electronic drive technology and serve the purpose of controlling AC motors, three phase motors or stepping motors. Stepping motors are particularly utilized in precision drives with which prescribed speeds can be exactly observed and exact positionings can be undertaken.

In, for example, the field of reproduction technology, such precision drives for stepping motors are employed in input scanners for point-by-point and line-by-line scanning of originals, or are employed in output scanners for recording information. In an input scanner, a light ray is conducted across an original point-by-point and line-by-line with a rotating deflection system, for example in the form of a polygonal mirror, and the scan light reflected by or transmitted through the original is converted into an image signal in an optoelectronic transducer. In an output scanner (recorder, exposer), a light ray that is intensity-modulated by an image signal is guided over a recording material point-by-point and line-by-line with the rotating deflection system. In a flat bed apparatus, original or recording material are mounted on a planar mount that moves perpendicular to the line direction during the line-by-line scanning. In an inside-drum apparatus, the mount for the original or the recording material is designed as a stationary half-shell or trough, whereas the deflection system, which guides the light ray radially across the half-shell perpendicular to the longitudinal axis of the half-shell, moves parallel to the longitudinal axis.

Required, among other things, for a good reproduction quality is that the lines scanned by the light ray proceed straight and parallel to one another, and that the line starts and line ends lie exactly on lines proceeding perpendicularly relative to the line direction.

Since even slight geometry errors have a disturbing effect, the deflection system for the light ray and the mount for the original or for the recording material must be moved by precision drives, whereby the deflection motion of the light ray and the conveying motion of the mount for the original or for the recording material must also be synchronized with one another in order to observe the required precision. Occasionally, speed deviations due to tolerances and imprecisions in manufacture of the drive elements must also be corrected. Furthermore, the precision drives in output scanners must be designed such that the recording continues in what is referred to as start/stop operation without offset at the same location of the recording material at which it was interrupted. For example, an output scanner must be operated in start/stop operation when it is not assured that the computer present for editing the recording data, also referred to as a raster-image-processor (RIP), cannot continuously offer the recording data for modulation of the recording light ray during the recording.

A circuit arrangement for controlling a stepping motor is disclosed, for example, by EP-B-0 228 475, this being composed of a clock generator, of an adjustable frequency demultiplication stage, of a motor controller stage and of a motor amplifier. A motor clock sequence having a variable motor frequency is generated in the frequency demultiplication stage from a basic clock sequence with constant frequency generated in the clock generator. The motor frequency defines the speed or the stepping frequency of the stepping motor in the individual operating phases, i.e. in the run-up phase, in the working phase, and in the deceleration phase.

Cyclically successive switching pulses that are supplied to the motor amplifier are acquired from the motor clock sequence in the motor controller stage, for example with the assistance of a ring counter. The motor amplifier is composed of a DC voltage source that, for generating a rotary field, is cyclically switched at the stator windings of the stepping motor with the assistance of switches actuated by the switching pulses (full-step operation).

The full-step control has the disadvantage that motor resonances and load resonances can be induced at low and moderate stepping frequencies because the rotor of the stepping motor must be very rapidly accelerated and decelerated in alternation according to the frequency of the switching pulses. In an output scanner, such resonances would lead to non-uniform conveying speeds for the recording material, and thus would lead to a deterioration of the reproduction quality.

It has already been disclosed for improving the precision drives to operate a stepping motor in what is referred to as a micro-step mode, whereby the stepping motor is charged by two AC voltages or phase currents that are phase-shifted by 90° relative to one another, as a result whereof angular velocities that are constant and free of resonance are achieved in the range of low stepping frequencies.

For setting the speed of a stepping motor working in a micro-step mode, for example, a counter is pre-set with a load value that defines the speed of the stepping motor and is deincremented by a counting clock sequence having a constant clock frequency. This counter respectively outputs a control pulse at the counter reading of "zero", a ring counter being incremented with this control pulse. The output values of the ring counter address a memory in which sine and cosine values are deposited for generating the two AC voltages or phase currents. The digital sine and cosine values read out from the memory are converted into the AC voltages or phase currents in digital-to-analog converters, these AC voltages or phase currents then being forwarded via motor amplifiers to the stepping motor, as a result whereof the stepping motor executes a micro-step at every control pulse output by the counter, whereas the micro-step frequency is proportional to the reciprocal of the load value for the counter.

Since an extremely high load value for the counter must thus be selected for a high resolution of the speed setting, it is necessary to employ a counting clock sequence having an extremely high clock frequency; disadvantageously, this can only be realized with a relatively high circuit expense.

EP-A-0 163 850, corresponding to U.S. Pat. No. 4,704,698 likewise already discloses a method and a recording apparatus 101 for the synchronization of the conveying motion of a mount for a recording material 103 with the deflection motion of a deflection system deflecting a beam 102 in an output scanner working in the start/stop mode, whereby two synchronously sequencing events must be correlated with one another with the assistance of reference signals (FIG. 1 described hereafter shows this prior art recording apparatus).

SUMMARY OF THE INVENTION

It is an object of the invention to improve a method and a circuit arrangement for controlling an electric motor such that a qualitatively high-grade motor controller is realized with comparatively low technological expense.

DESCRIPTION OF THE PREFERRED EMBODIMENTS

Figure 1:
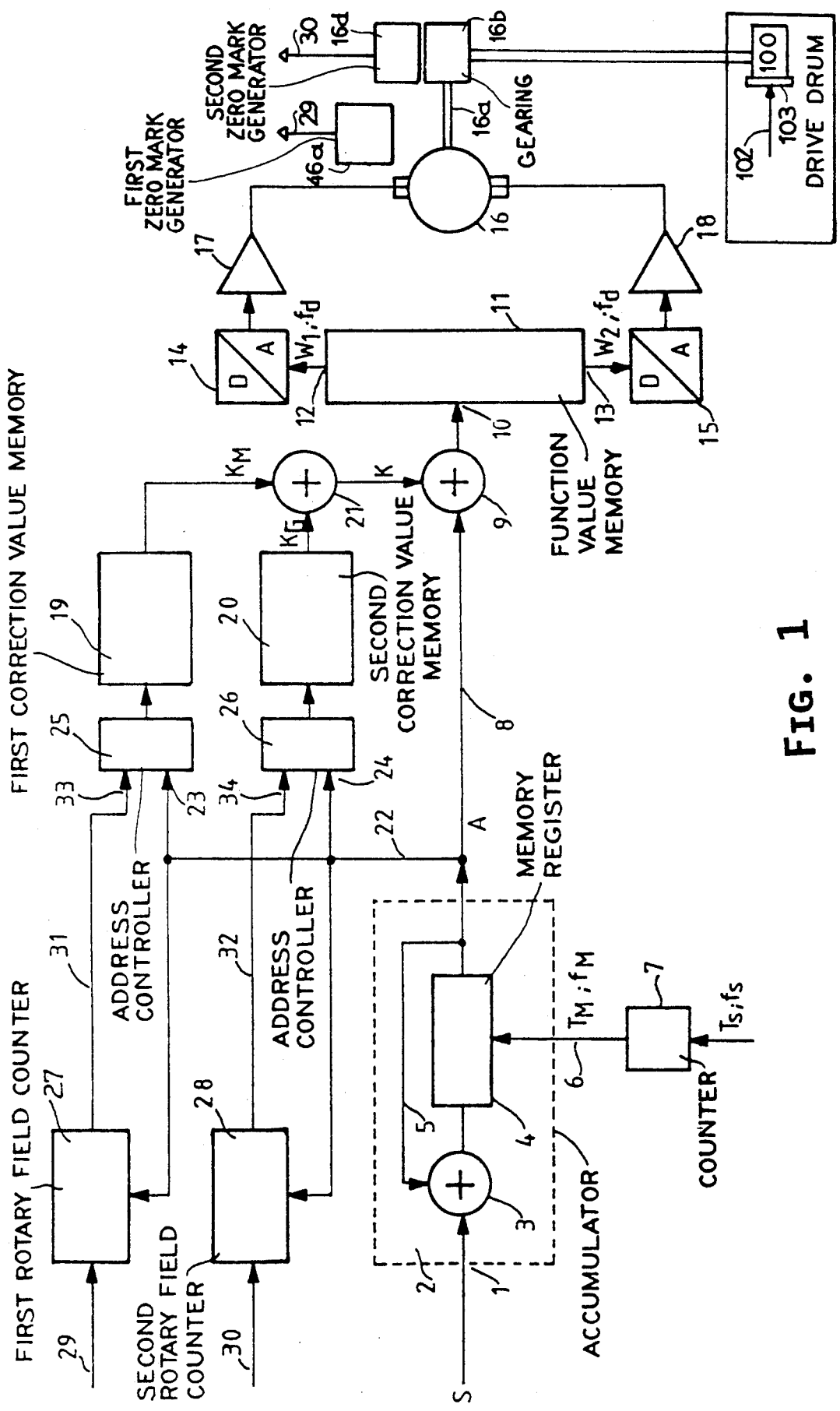
FIG. 1 is a fundamental block circuit diagram of a circuit arrangement according to the invention for driving an electric motor.

FIG. 1 shows a fundamental block circuit diagram of a circuit arrangement for controlling an electric motor, preferably a stepping motor that works in a micro-step mode.

A prescribable rated value S is forwarded via a programming input 1 to an accumulator 2 that is composed of an adder stage 3 and of a following memory register 4. The output of the memory register 4 is fed back onto the adder stage 3 via a line 5. The memory register 4 is clocked by a micro-step clock sequence $T_M$ having a micro-step frequency $f_M$ on a line 6, this being acquired by frequency division in a counter 7 from a system clock sequence $T_S$ having a constant system frequency $f_S$.

The rated value S is continuously added up (accumulated) in the accumulator 2 with the assistance of the micro-step clock sequence $T_M$ until the value that is added up and intermediately stored in the memory register 4 overflows, a new accumulation process then being begun. The intermediately stored values form the output signal A of the accumulator 2. For generating micro-steps, the output signal A is forwarded via a line 8 and a further adder stage 9 to the address input 10 of a function value memory 11 wherein at least one curve progression (wave shape) in the form of digital function values is stored. In the exemplary embodiment, sine and cosine values for generating AC voltages are deposited in the function value memory 11. The stored sine and cosine values are addressed by the output signal A of the accumulator 2 and are output via data outputs 12, 13 of the function value memory 11. The output sine and cosine values are then converted in digital-to-analog converters 14, 15 into analog AC voltages $W_1$ and $W_2$ having the output frequency $f_d$ and having a mutual phase shift of 90° with which a stepping motor 16 is supplied via motor amplifiers 17, 18 for generating a rotary field having the rotary field frequency $f_d$.

The maximum plurality of micro-steps per rotary field is prescribed by the bit width of the accumulator 2. The output frequency $f_d$ derives from the prescribed rated value S, from the micro-step frequency $f_M$, and from the bit width U of the accumulator 2 according to equation (1):

$$f_d = \frac{s \cdot f_M}{U} \qquad (1)$$

In order to guarantee a high precision in the generation of the curve shape, it has proven expedient to select the micro-step frequency $f_M$ significantly higher than the output frequency $f_d$.

The rotating speed of the stepping motor 16 can thus be controlled via the rated value S and/or the micro-step frequency $f_M$. A time-dependent rated value S required for the operation of a stepping motor in an acceleration, working, and deceleration phase is generated, for example, in what is referred to as a ramp generator that is not shown in FIG. 1.

The accumulator 2 in combination with the function value memory 11 forms what is a numerically controlled oscillator (NCO) in terms of function, wherein a numerical value, the rated value S in the present case, is converted into at least one oscillating voltage, and into the phase-shifted AC voltages $W_1$ and $W_2$ in the present case.

It has proven practical in practice to realize the accumulator 2 and the function value memory 11 in the present circuit arrangement with a commercially available NCO module, for example a 32-bit CMOS NCO of the type STEL-1172B of Stanford Telecom.

Since such NCO modules are available with a bit width of 32 bits and more, and can be unproblematically operated with extremely high clock frequencies, high micro-step frequencies with high resolution can be realized with the present circuit arrangement. Thus, precise rotating velocity settings at a stepping motor can be undertaken as required, for example, in reproduction technology when conveying the recording material in output scanners (recorders, exposers). Since tolerances and manufacturing imprecisions of the stepping motor and of the mechanical drive components influence the precision of the conveying speed of the recording material (this ultimately defining the recording quality), what is crucial in practice is to not only see to an exact drive of the stepping motor but to also simultaneously correct speed errors caused by tolerances and manufacturing imprecisions.

The present circuit arrangement constructed with a numerically controlled oscillator is especially suitable for executing the required speed corrections with little expense, and nonetheless precisely.

For correcting diameter tolerances of a drive drum 100 shown in FIG. 1 in an output scanner, for example, a recording material can be exposed in a test run for a defined time span at a calculated conveying speed. After the test run, the exposed recording material is measured in terms of density and the conveying speed actually present during the test run is calculated from the measured density values and from the intensity of the exposing light ray. On the basis of this acquisition by measurement, a speed correction value $K_S$ can be subsequently calculated from the prescribed rated value S, from the deviation, and from the rated distance according to equation (2), this being added to the prescribed rated value S with correct operational sign in order to compensate the errors caused by the drive drum with a correction of the speed.

$$K_S = (S) \frac{\text{deviation}}{\text{rated distance}} \qquad (2)$$

Speed errors caused by the stepping motor 16 and by the gearing 16b can likewise be advantageously corrected in that the output signal A of the accumulator 2 is corrected before the addressing of the function value memory 11 by the addition of correction values K in the adder stage 9, as a result whereof a corresponding address correction is undertaken for the function value memory 11.

In the circuit arrangement of FIG. 1, motor correction values $K_M$ for a correction of motor errors are deposited in a first correction value memory 19, and gearing correction values $K_G$ for a corresponding correction of gearing errors are deposited in a second correction value memory 20. The correction values $K_M$ and $K_G$ are read out from the correction value memories 19, 20 synchronously with the generation of the output signal A in the accumulator 2, are combined to correction values K in a first adder stage 21, and are forwarded to the adder stage 9. For addressing the correction value memories 19, 20, the output signal A of the accumulator 2 is respectively forwarded via a line 22 to the first inputs 23, 24 of address controllers 25, 26 and are converted thereat into corresponding addresses for addressing the correction value memories 19, 20.

A plurality of rotary fields per motor revolution are required in the employment of stepping motors. A plurality of motor revolutions per gearing revolution are likewise carried out given employment of a gearing 16b connected to motor 16 by shaft 16a as shown in FIG. 1. It is therefore necessary in these instances to undertake a corresponding correction over a plurality of rotary fields. For that purpose, a first and a second rotary field counter 27, 28 are provided in the circuit arrangement of FIG. 1, the rotary field information (accumulator overflow) that is acquired from the output signal A on the line 22 being respectively counted therein. The first rotary field counter 27 is reset by a motor zero mark on a line 29 of a first zero mark generator 16c, and the second rotary field counter 28 is reset by a gearing zero mark on a line 30 of a second zero mark generator 16d, all as shown in FIG. 1.

The zero marks respectively signal specific angular positions of the motor or of the gearing, and are generated in the zero mark generators 16c and 16d that are coupled with the motor or with the gearing 16b. The output pulses of the rotary field counters 27, 28 are forwarded via lines 31, 32 to respective second inputs 33, 34 of the address controllers 25, 26 and are utilized therein together with the signal values of the output signal A for addressing the correction value memories 19, 20.

The separate calculation of correction values for a compensation of motor errors and gearing errors, and the separate implementation of the correction has the advantage that a corresponding correction is possible given any gearing contortion factor. Of course, only one of the correction value memories 19, 20 can be activated and utilized for correction as needed.

For calculating the motor correction values $K_M$ for a correction of motor errors, the motor fields are first measured in that the stepping motor is driven with a constant rotary field frequency and the traversed motor rotational angle Θ is measured with an extremely exact rotational angle generator, whereby the measurements are expediently implemented over an entire motor revolution. Dependent on the respective structure of the stepping motor, a different number of rotary fields is generated for this purpose.

The calculation of the motor correction values $K_M$ occurs based on the deviation from the respective rated value of the motor rotational angle Θ.

Figure 2:
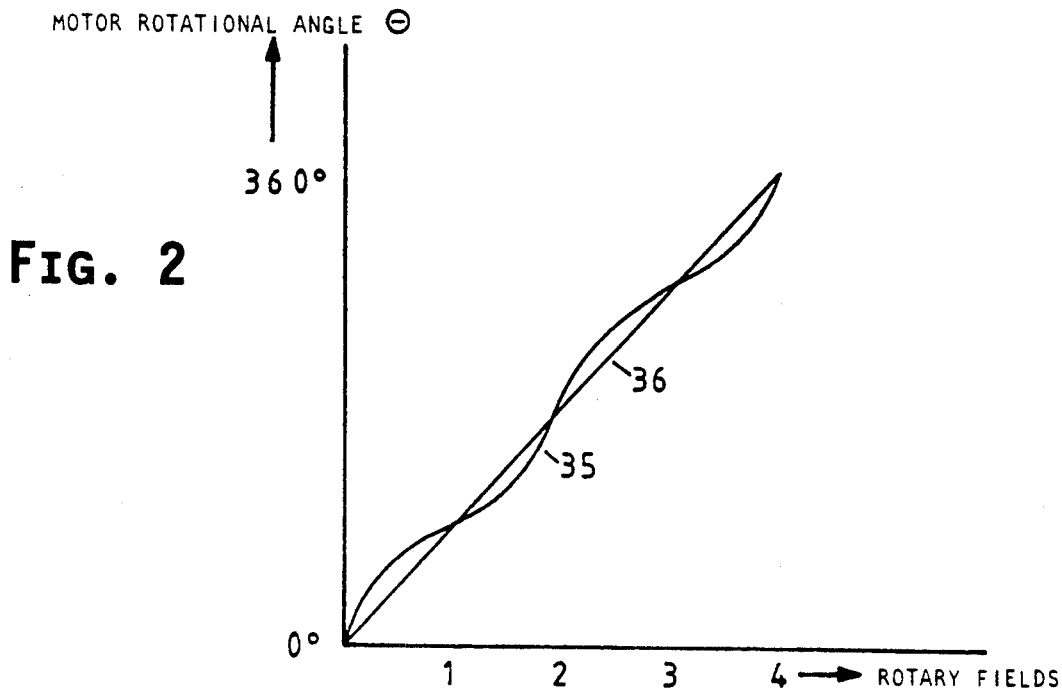
FIG. 2 is a graphic illustration of the calculation of correction values.
Figure 3:
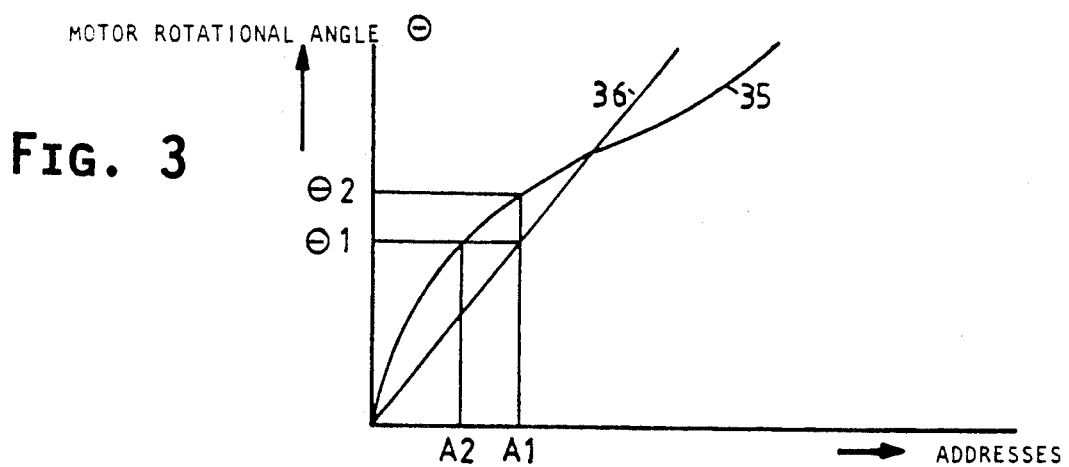
FIG. 3 is another graphic illustration.

For illustration, FIG. 2 shows the actual curve 35 and the ideal, linear curve 36 of the motor rotational angle Θ in the range from 0° through 360° by way of example in a coordinate system dependent on the rotary fields over an entire motor revolution, whereby a duration of four rotary fields per revolution is assumed. FIG. 3 shows the curve according to FIG. 2 with a magnification for the range around the origin of the coordinate system. Since the rotary fields of the stepping motor correspond to a specific address scope of the function value memory 11, the corresponding addresses are entered on the abscissa in FIG. 3. Given an address $A_1$, a motor rotational angle $\Theta_1$ derives from the linear curve 36 as a rotational angle rated value, whereas the real curve 35 leads to a motor rotational angle $\Theta_2$ as a rotary angle actual value. In order to achieve the actual rotary angle rated value, a corrected address $A_2$ must thus be employed.

Figure 4:
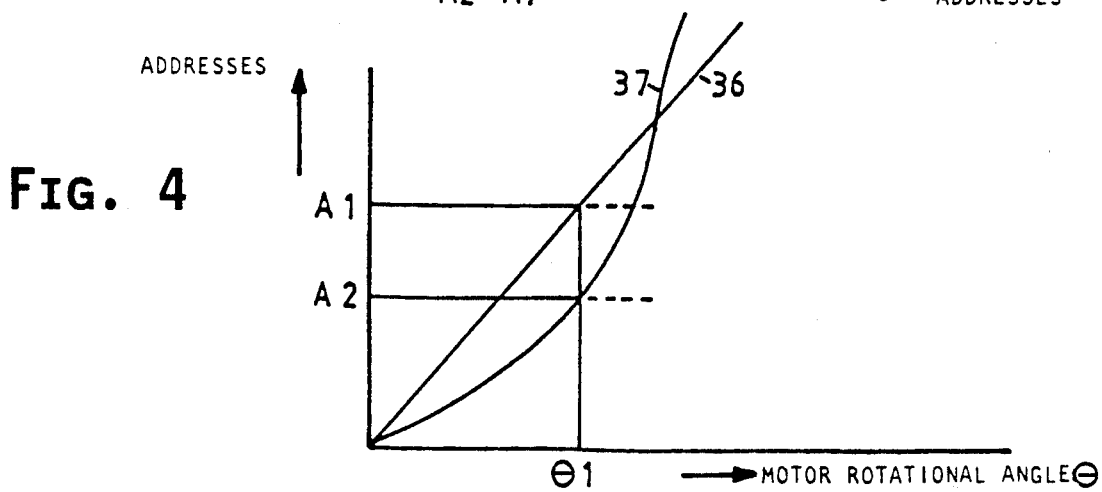
FIG. 4 is a different graphic illustration.

For linearization of the real curve 35, it is necessary to calculate an inverse function 37 whose curve is shown in FIG. 4. The motor correction values $K_M$ that are required for a corresponding address correction in the addressing of the function value memory 11 thereby derive from the inverse function 37 as differential values between the addresses $A_1$ and $A_2$.

The method for calculating the motor correction values $K_M$ can be fundamentally also employed in the same way for calculating the gearing correction values $K_G$. It is thereby particularly expedient to previously implement the correction of the motor errors and to measure the gearing characteristic via a complete gearing revolution.

Figure 5:
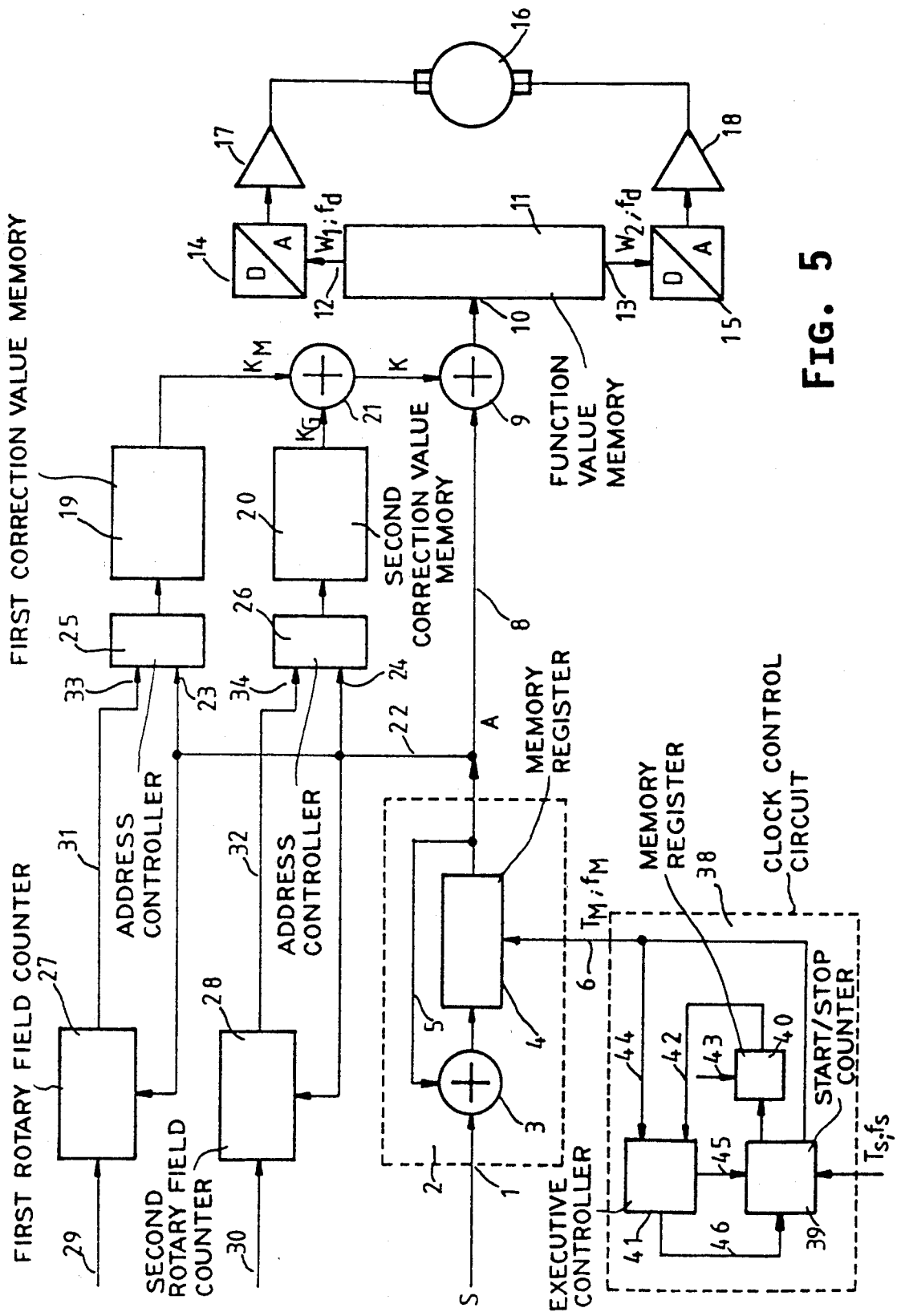
FIG. 5 is a fundamental block circuit diagram of a modified circuit arrangement of the invention for driving an electric motor.

FIG. 5 shows a modified exemplary embodiment of a circuit arrangement for the control of an electric motor. The modified circuit arrangement is augmented in comparison to the circuit arrangement shown in FIG. 1 by a clock control 38 with which a start/stop mode in an output scanner can be advantageously realized with high precision.

An output scanner must operate in a start/stop mode when the raster-image-processor (RIP) offers the recording data required for modulation of the light ray given a high recording speed more slowly than would be required for a continuous recording.

When the recording data cannot be supplied in this case with the corresponding speed, the raster-image-processor forwards a stop instruction to the motor controller; that line which is being recorded at the very time of the start/stop instruction is recorded up to its end, and the conveying motion of the recording material is then decelerated to standstill. Due to the mass moment of inertia, the deceleration event requires a certain time wherein the recording material continues to move beyond the end of the recording, so that no recording without offset can occur without a suitable technique. Upon interruption of the recording, the recording material must therefore be moved from beyond the end of recording opposite the actual conveying direction into a waiting position from which it is again accelerated in the conveying direction upon continuation of the recording until the rated speed is reached at the end of recording and the recording can be continued without offset.

In order to achieve a seamless recording given an interruption in recording, the deflection motion of the light ray and the conveying motion of the recording material must also be synchronized with one another. Reference pulses, also referred to as grid or area pulses, are required for synchronization, these respectively signalling the beginning of a line. Such reference pulses, for example, can be generated with an optoelectronic sensor that generates a reference pulse every time it is impinged by the deflected light ray.

These reference pulses occur as a consequence of synchronism fluctuations of the deflection system asynchronously relative to the micro-step clocks acquired in the motor control. A synchronization error that can maximally reach the period duration of the micro-step frequency $f_M$ results therefrom. As a result of this imprecise synchronization, disturbing gaps in the recording that considerably diminish the quality arise, given an interruption in the recording.

For reducing synchronization errors, the clock control circuit 38 is provided in the circuit arrangement of FIG. 5, such recording gaps being advantageously nearly entirely avoided therewith, or at least being made so small that they can no longer be perceived.

This clock control circuit 38 is composed of a loadable start/stop counter 39, of a memory register 40 and of an executive controller 41. In the start/stop counter 39, the system clock sequence $T_S$ having the system frequency $F_S$ is divided down to the required motor step clock sequence $T_M$ having the micro-step frequency $f_M$, and is supplied to the accumulator 2 via the line 6, whereby the system frequency $f_S$ is selected clearly higher than the micro-step frequency $f_M$. The counter reading $Z_S$ of the start/stop counter 39 at the time of a reference pulse is identified with the assistance of the memory register 40 and is forwarded via a line 42 to the executive sequencer 41. The reference pulses are supplied to the memory register 40 via a line 43. The counter reading $Z_S$ respectively corresponds to the plurality of counter clocks of the system clock sequence $T_S$ at the time of the reference pulses. The plurality $Z_M$ that have occurred at specific times is counted in the executive sequencer 41, and pre-loading values V and reset pulses for the start/stop counter 39 are also generated.

For counting the plurality $Z_M$ of micro-step clocks, the executive sequencer 41 is supplied with the micro-step clock sequence $T_M$ via a line 44. The pre-loading values V and reset pulses proceed via lines 45, 46 to the start/stop counter 39.

The chronological function sequence given a start/stop mode shall be set forth in greater detail with reference to FIG. 6.

Figure 6:
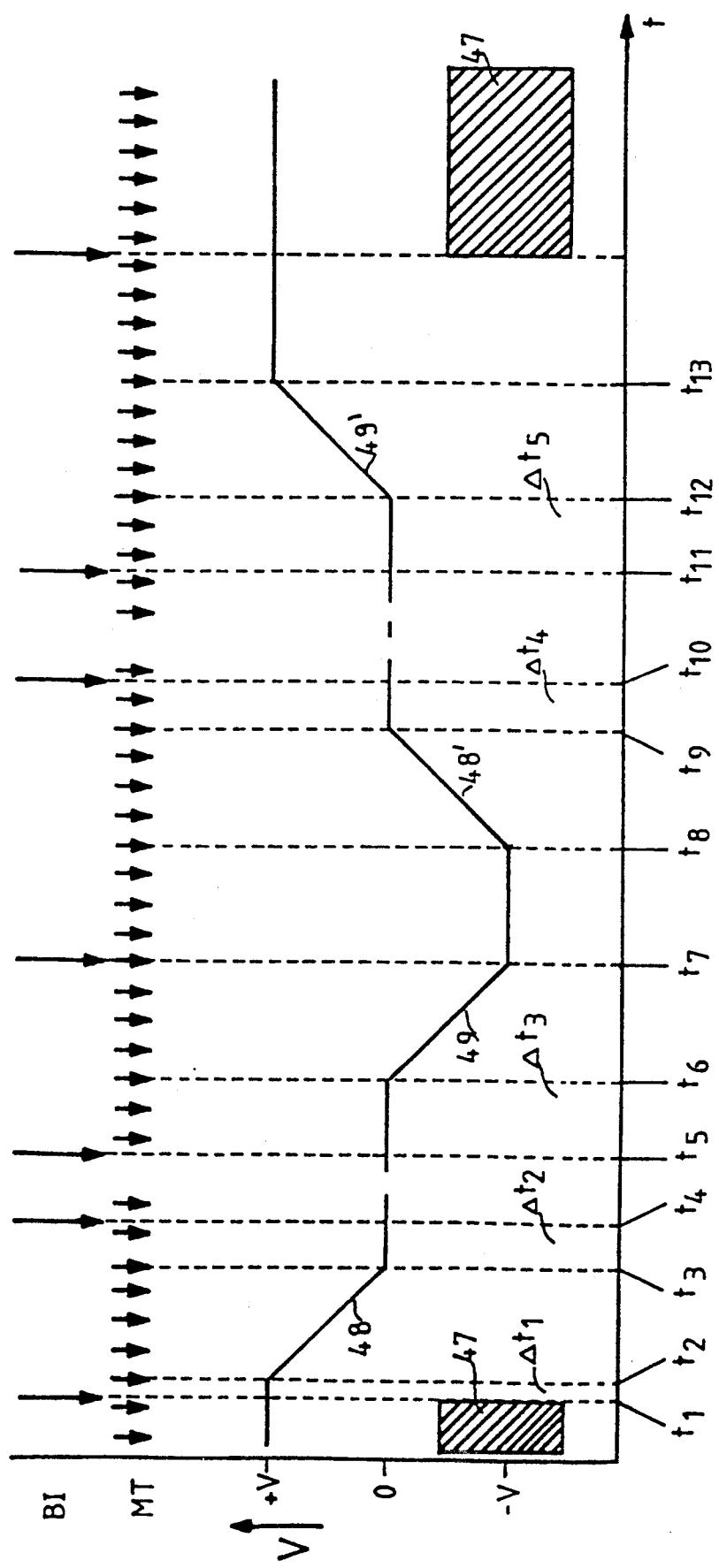
FIG. 6 is another graphic illustration for explaining functions of the invention.

In a coordinate system, FIG. 6 shows the conveying speed v of the recording material, or the speed of the stepping motor as a function of time 5, and also shows the chronological allocation of the reference pulses BI and of the micro-step clocks MT to the speed curve. Recording time spans 47 are also shown as shaded areas, and a space free of recording lying therebetween is also shown.

As a result of a stop instruction of the raster-image-processor, the current line is first recorded up to its end. A first reference pulse occurs at time $t_1$ following the stop instruction. The ramp-shaped deceleration 48 of the recording material up to standstill at time $t_3$ is begun with the first micro-step clock at the time $t_2$ that occurs following the first reference pulse. The time difference $\Delta t_1 = t_2 - t_1$ between the first reference pulse and the first micro-step clock derives according to equation (3) from the plurality $Z_{S1}$ of clocks of the system clock sequence $T_S$ counted in the start/stop counter 39 and the system frequency $f_S$ as follows:

$$\Delta t_1 = \frac{Z_{S1}}{f_S} \quad (3)$$

After the recording material has come to a standstill at time $t_3$, the time difference $\Delta t_2$ with respect to the second reference pulse is calculated, this appearing at time $t_4$. This time difference $\Delta t_2 = t_4 - t_3$ derives according to equation (4) from the plurality $Z_{M1}$ of micro-step clocks at time $t_3$, from the plurality $Z_{S2}$ of counter clocks of the system clock sequence $T_S$, from the system frequency $f_S$, and from the division factor Q as follows:

$$\Delta t_2 = \frac{Z_{S2} + Z_{M1} \cdot Q}{f_S} \quad (4)$$

After the expiration of a response time to settle the system, the start/stop counter 39 is arrested and is loaded via the line 45 with a time value calculated in the executive sequencer 41 as pre-loading value V, this deriving according to equation (5) from the time differences $\Delta t_1$ and $\Delta t_2$ as well as from the system frequency $f_S$ as follows:

$$V = (\Delta t_1 + \Delta t_2)f_S = V_1 + Z_{M2} \quad (5)$$

A value that is higher than the maximally loadable counter value can derive as a result of the addition carried out according to equation (5). The start/stop counter 39 loaded with the residual value $V_1$ from equation (5) is therefore started with the reference pulse at time $t_5$ appearing after the response time, and the plurality of micro-step clocks $Z_{M2}$ that correspond to the carry from equation (5) is awaited in the executive sequencer 41.

As a result thereof, and according to the time difference $\Delta t_3 = \Delta t_1 + \Delta t_2$, a ramp-shaped backward acceleration 49 of the recording material from standstill to the speed $-v$ is initiated at time $t_6$, which is opposite to the conveying direction during recording. Since the deceleration ramp 48 during the forward motion of the recording material and the acceleration ramp 49 during the backward motion are selected equal in length, it is guaranteed that the end of the acceleration ramp 49 exactly coincides with a reference pulse at time $t_7$.

After the end of the backward acceleration at time $t_7$, the recording material is moved with constant speed $-v$ beyond the end of recording at the interruption in recording, and the deceleration according to the deceleration ramp 48' is initiated at time $t_8$, this being ended at time $t_9$ in a waiting position. The backward travel path crossed from the end of recording up to the waiting position corresponds to a whole plurality of micro-steps that are counted and stored during the backward travel path. Subsequently, the time difference $\Delta t_4$ from the time the waiting position is reached at time $t_9$ up to the appearance of a reference pulse at time $t_{10}$ is calculated. This time difference $\Delta t_4$ derives according to equation (6) from the counted plurality $Z_{S3}$ of clocks of the system clock sequence $T_S$, from the counted plurality $Z_{M3}$ of micro-step clocks, from the system frequency $f_S$, and from the division factor Q as follows:

$$\Delta t_4 = \frac{Z_{S3} + Z_{M3} \cdot Q}{f_S} \quad (6)$$

After the expiration of a decay time following the deceleration, the start/stop counter 39 is again arrested and is loaded with a new pre-loading value V that is calculated according to equation (7) from the time differences $\Delta t_1$ and $\Delta t_4$ as well as from the system frequency $f_S$ as follows:

$$V = (\Delta t_1 + \Delta t_4) f_S = Z_{M4} + V_2 \quad (7)$$

A value that is higher than the maximally loadable counter value can derive as a result of the addition implemented according to equation (7). After a start instruction from the raster-image-processor, the start/stop counter 39 loaded with the residual value $V_2$ from equation (7) is started with the reference pulse appearing after the response time at time $t_{11}$, and the plurality of micro-step clocks $Z_{M4}$ that correspond to the carry from equation (7) is waited for in the executive sequencer 41. As a result thereof, the recording material is accelerated according to an acceleration ramp 49' to the conveying speed $+v$ at time $t_{12}$ after expiration of the time difference $\Delta t_5 = \Delta t_1 + \Delta t_4$, this conveying speed $+v$ being reached at time $t_{13}$. After the end of the acceleration, the recording material is moved with the conveying speed $+v$ being reached at time $t_{13}$. After the end of the acceleration, the recording material is moved with the conveying speed $+v$ by a forward travel path that corresponds to the backward travel path. After the forward travel path, exactly that position of the recording material at which the stop instruction previously occurred in the interruption of recording is reached synchronously with a further reference pulse, as a result whereof it is advantageously assured that only a negligible synchronization error occurs and the recording can thus be continued without offset.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for controlling a synchronous motor with an AC voltage, comprising the steps of:
   providing a rated value corresponding to a desired frequency of the AC voltage related to a rotational speed of the synchronous motor;
   continuously adding the rated value in an accumulator by use of a micro-step clock sequence and providing added-up signal values;
   employing the added-up signal values of the accumulator for addressing stored function values in a function value memory, the function values representing at least one curve progression defining a wave shaped for said AC voltage;
   reading out the addressed function values from the function value memory and converting them into said AC voltage said desired frequency corresponding to said rated value;
   supplying said AC voltage to the synchronous motor for generating a rotary field wherein said frequency of said AC voltage defines said rotational speed of the synchronous motor;
   for compensating speed errors due to errors of the synchronous motor
      calculating motor correction values and storing them in a correction value memory,
      addressing the stored motor correction values by said signal values of said accumulator and reading them out from the correction value memory, and
      adding the motor correction values which have been read out with correct operational sign to said signal values of said accumulator before addressing said function value memory in order to correct addresses of the function value memory; and for calculating the motor correction values
      identifying the motor errors by measuring a traverse rotational angle of the synchronous motor over at least one of a rotary field or an address range of the function value memory corresponding to said rotary field; and
      identifying deviations of the measured rotational angle from a rated curve and acquiring from said deviations the motor correction values for the correction of the addresses of the function value memory.

2. A method for controlling a synchronous motor with an AC voltage, comprising the steps of:
   providing a rated value corresponding to a desired frequency of the AC voltage related to a rotational speed of the synchronous motor;
   continuously adding the rated value in an accumulator by use of a micro-step clock sequence and providing added-up signal values;
   employing the added-up signal values of the accumulator for addressing stored function values in a function value memory, the function values representing at least one curve progression defining a wave shaped for said AC voltage;
   reading out the addressed function values from the function value memory and converting them into said AC voltage having said desired frequency corresponding to said rated value;
   supplying said AC voltage to the synchronous motor for generating a rotary field wherein said frequency of said AC voltage defines said rotational speed of the synchronous motor;
   providing the synchronous motor coupled to a gearing;
   for compensation of speed errors due to errors of the gearing, calculating gearing correction values and storing them in a correction value memory;
   addressing the stored gearing correction values by said signal values of said accumulator and reading out said stored gearing correction values from the correction value memory; and
   adding with correct operational sign the gearing correction values that have been read out to said signal values of said accumulator before addressing said function value memory in order to correct the addresses of the function value memory.

3. A method according to claim 2 including the step of undertaking said compensation of said gearing errors over a plurality of rotary fields of the synchronous motor.

4. A method according to claim 2 including the steps of:
- identifying rotary fields of said synchrouous motor by counting said signal values of said accumulator in a second rotary field counter;
- continuously resetting said second rotary field counter by a zero mark pulse signaling a specific angular position of the gearing; and
- utilizing output signal values of said second rotary field counter together with said signal values of said accumulator for addressing said correction value memory for said gearing correction values.

5. A method according to claim 4 including the step of determining a respective plurality of clocks of a system clock sequence with a memory register at points in time defined by reference pulses.

6. A method for controlling a synchronous motor with an AC voltage, comprising the steps of:
- providing a rated value corresponding to a desired frequency of the AC voltage related to a rotational speed of the synchronous motor;
- continuously adding the rated value in an accumulator by use of a micro-step clock sequence and providing added-up signal values;
- employing the added-up signal values of the accumulator for addressing stored function values in a function value memory, the function values representing at least one curve progression defining a wave shaped for said AC voltage;
- reading out the addressed function values from the function value memory and converting them into said AC voltage having said desired frequency corresponding to said rated value;
- supplying said AC voltage to the synchronous motor for generating a rotary field wherein said frequency of said AC voltage defines said rotational speed of the synchronous motor; and
- employing said synchronous motor in a recording apparatus for implementation of a start/stop operation and wherein recording data modulates a recording beam deflected line-by-line across a recording material, every line start being marked by a reference pulse, the recording material being conveyed perpendicular to a line direction by said synchronous motor, and wherein for synchronization of deflection motion of the recording material with a conveying motion of the recording material upon continuation of the recording after an interruption in recording, the following steps are performed:
  - identifying a first time difference between a first reference pulse following interruption in recording and a first micro-step clock following said first reference pulse,
  - beginning with said first micro-step clock, decelerating said synchronous motor from a conveying speed to stand still according to a deceleration ramp within a defined time interval by modifying the rated value,
  - calculating a second time difference between the time of the stand still up to occurrence of another reference pulse,
  - forming a third time difference by addition of the calculated first and second time differences,
  - accelerating the synchronous motor from stand still up to a conveying speed but in a direction opposite the conveying direction according to an acceleration ramp within said defined time interval by modifying said rated value, the acceleration being delayed by said third time difference from a time of occurrence of a further reference pulse following a setting time for the synchronous motor,
  - moving the synchronous motor by a predetermined distance with said conveying speed in a direction opposite the conveying direction and then decelerating the synchronous motor according to a deceleration ramp from the conveying speed up to stand still in a waiting position within said defined time interval by modifying said rated value,
  - identifying a fourth time difference between a time of stand still and a time of appearance of a further reference pulse,
  - forming a fifth time difference by addition of said first and third time differences, and
  - delayed by said fifth time difference from a time difference of appearance of a further reference pulse following a settling time for the synchronous motor, accelerating the synchronous motor from stand still in the waiting position to said conveying speed in said conveying direction according to an acceleration ramp within said defined time interval by modifying said rated value, and moving the motor by said predetermined distance and then continuing the recording with a next reference pulse following traversal of said predetermined distance.

7. A method for controlling a synchronous motor for implementation of an exact start/stop positioning operation in a recording apparatus, said synchronous motor being driven by an AC voltage, and said synchronous motor being coupled to a gearing, comprising the steps of:
- providing a rated value corresponding to a desired frequency of the AC voltage related to a rotational speed of the synchronous motor;
- continuously adding the rated value in an accumulator controlled by a micro-step clock sequence and providing accumulated signal values;
- calculating motor correction values for compensating speed errors due to errors of the synchronous motor and storing said motor correction values in a first correction value memory;
- calculating gearing correction values for compensating speed errors due to errors of the gearing, and storing said gearing correction values in a second correction value memory;
- addressing the first and second correction value memory by said accumulated signal values of said accumulator;
- reading the motor correction values and the gearing correction values out from the first and second correction value memory;
- adding the read out motor correction values and/or gearing correction values with correct operational signs to said accumulated signal values to obtain corrected accumulated signal values;
- employing said corrected accumulated signal values for addressing stored function values in a function value memory, the function values representing at least one curve progression defining a wave shaped for said AC voltage;

reading out the addressed function values from the function value memory and converting them into said AC voltage having said desired frequency corresponding to said rated value;

supplying said AC voltage to the synchronous motor for generating a rotary field wherein said frequency of said AC voltage defines said rotational speed of the synchronous motor; and for positioning of said synchronous motor generating said micro-step clock sequence from a system clock sequence by frequency division in a start/stop counter which is loadable with calculated pre-loading values and is resettable by reset pulses.

8. A method according to claim 7 including the step of selecting a frequency of said micro-step clock sequence significantly higher than a maximum frequency of said AC voltage.

9. A method according to claim 7 including the step of constructing said accumulator for adding up the rated value and said function value memory for generating said AC voltage from a numerically controlled oscillator integrated circuit (NCO).

10. A method according to claim 7 including the step of:

coupling said synchronous motor to a drive drum;

calculating speed correction values for compensation of speed errors due to diameter tolerances of said drive drum; and adding the speed correction values with correct operational sign to said rated value.

11. A method according to claim 7 wherein for calculating the motor correction values:

identifying the errors of said synchronous motor by measuring a traverse rotational angle of the synchronous motor over at least one of a rotary field or an address range of the function value memory corresponding to said rotary field;

identifying deviations of the measured rotational angle from a rated curve; and acquiring from said deviations said motor correction values.

12. A method according to claim 7 including the step of compensating the speed errors due to the errors of said synchronous motor over a plurality of rotary fields of said synchronous motor by:

identifying rotary fields of the synchronous motor by counting said accumulated signals values of said accumulator in a first rotary field counter;

continuously resetting the first rotary field counter by a zero mark pulse signalling a specific angular position of said synchronous motor; and addressing said correction value memory for said motor correction values by the output signal values of said first rotary field counter and by said accumulated signal values of said accumulator for compensating the speed errors due to errors of said synchronous motor.

13. A method according to claim 7 including the step of compensating of said speed errors due to the errors of the gearing over a plurality of rotary fields of said synchronous motor by:

identifying rotary fields of said synchronous motor by counting said accumulated signal values of said accumulator in a second rotary field counter;

continuously resetting said second rotary field counter by a zero mark pulse signalling a specific angular position of the gearing; and addressing said correction value memory for said gearing correction values by the output signal values of said second rotary field counter and by said accumulated signal values of said accumulator for compensating the speed errors due to errors of said gearing.

14. A method according to claim 7 including the step of determining a respective plurality of clocks of a system clock sequence with a memory register at points in time defined by reference pulses.

15. A method according to claim 7 wherein recording data modulates a recording beam of said recording apparatus, said recording beam being deflected line-by-line across a recording material, every line start being marked by a reference pulse, the recording material being conveyed perpendicular to a line direction by said synchronous motor, and for synchronization of deflection motion of the recording material with a conveying motion of the recording material upon continuation of the recording after an interruption in recording during start/stop operation, performing the following steps:

identifying a first time difference between a first reference pulse following interruption in recording and a first micro-step clock following said first reference pulse;

decelerating said synchronous motor from a conveying speed to stand still according to a deceleration ramp within a defined time interval by modifying the rated value beginning with said first micro-step clock;

calculating a second time difference between the time of the stand still up to occurrence of another reference pulse;

forming a third time difference by addition of the calculated first and second time differences;

accelerating the synchronous motor from stand still up to a conveying speed but in a direction opposite the conveying direction according to an acceleration ramp within said defined time interval by modifying said rated value, the acceleration being delayed by said third time difference from a time of occurrence of a further reference pulse following a settling time for the synchronous motor;

moving the synchronous motor by a predetermined distance with said conveying speed in a direction opposite the conveying direction;

decelerating the synchronous motor according to a deceleration ramp from the conveying speed up to stand still in a waiting position within said defined time interval by modifying said rated value;

identifying a fourth time difference between a time of stand still and a time of appearance of a further reference pulse;

forming a fifth time difference by addition of said first and third time differences;

delayed by said fifth time difference from a time difference of appearance of a further reference pulse following a settling time for the synchronous motor, accelerating the synchronous motor from stand still in the waiting position to said conveying speed in said conveying direction according to an acceleration ramp within said defined time interval by modifying said rated value;

moving the motor by said predetermined distance; and continuing the recording with a next reference pulse following traversal of said predetermined distance.

16. A circuit arrangement for controlling a synchronous motor for implementation of an exact start/stop positioning operation of said synchronous motor in a recording apparatus, said synchronous motor being driven by an AC voltage by providing a rated value proportional to a desired frequency of the AC voltage related to a rotational speed of the synchronous motor, comprising:

an accumulator means for adding up said rated value proportional to said desired frequency of said AC voltage by a micro-step clock sequence input to said accumulator means;

start/stop counter means connected to said accumulator means for acquiring said micro-step clock sequence from a system clock sequence by frequency division, said start/stop counter means being loadable with calculated preloading values and being resettable by reset pulses;

a first correction value memory means for storing motor correction values, an address input thereof being connected to the output of said accumulator means;

a second correction value memory means for storing gearing correction values, an address input thereof being connected to the output of said accumulator means;

adder stage means for adding said motor correction values and said gear correction values to said accumulated signal values, said adder stage means being connected to an output of said accumulator means and to data outputs of said first and second correction value memory means;

a function value memory means for storing function values representing the AC voltage, an address input thereof being connected to an output of said adder stage means;

D/A converter means connected to a data output of said function value memory means for converting function values read out from the function value memory means into said AC voltage; and a synchronous motor connected to said D/A converter means.

17. A circuit arrangement according to claim 5 wherein said accumulator means and said function value memory means are constructed of a numerically controlled oscillator integrated circuit means (NCO).

18. A circuit arrangement according to claim 5 further including a first rotary field counter means for determination of rotary fields of the synchronous motor, an input thereof being connected to said output of said accumulator means and an output thereof being connected to said input of said first correction value memory means for the motor correction values and a reset input thereof having input thereto a zero mark pulse of the synchronous motor.

19. A circuit arrangement according to claim 5 including a second rotary field counter means whose input is connected to said output of said accumulator means and whose output is connected to said input of said second correction value memory means for the gearing correction values, and whose reset input is connected to receive a zero mark pulse of the gearing.

* * * * *